E. & C. L. MOORE.
MILK PAIL HOLDER.
APPLICATION FILED OCT. 9, 1909.
976,276.
Patented Nov. 22, 1910.
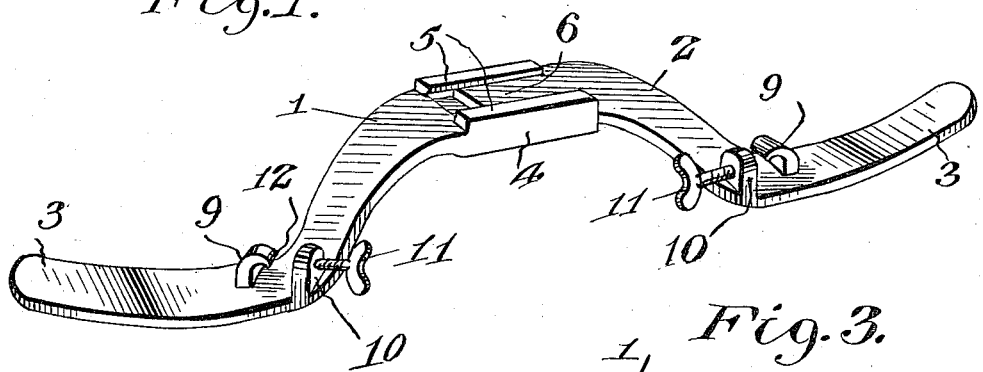
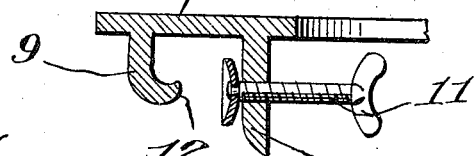
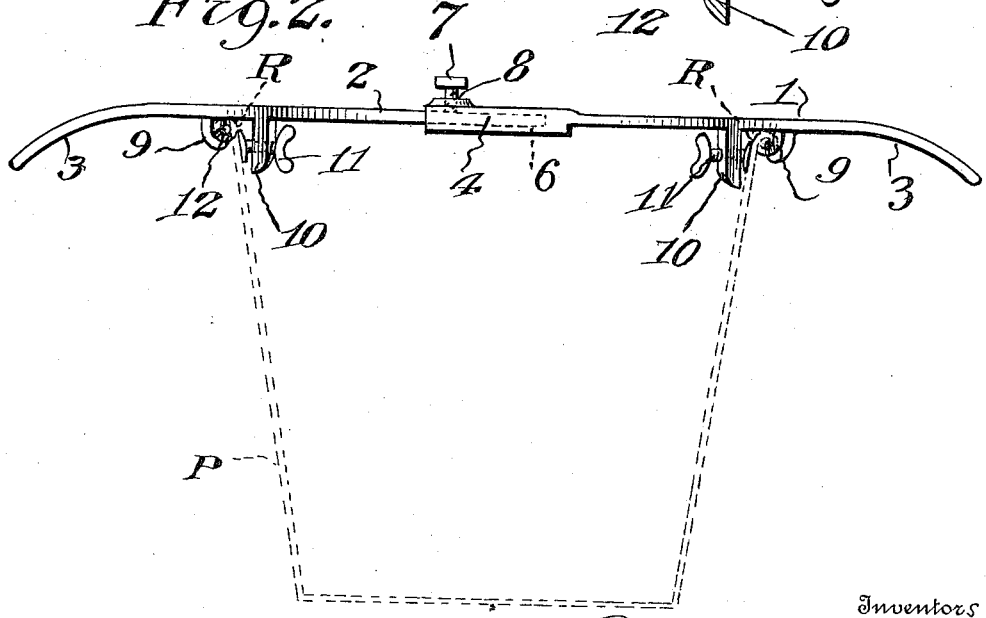

UNITED STATES PATENT OFFICE.

EDWARD MOORE AND CHARLES L. MOORE, OF FRANKLINVILLE, NEW YORK.

MILK-PAIL HOLDER.

976,276.  Specification of Letters Patent.  Patented Nov. 22, 1910.

Application filed October 9, 1909.  Serial No. 521,867.

*To all whom it may concern:*

Be it known that we, EDWARD MOORE and CHARLES L. MOORE, citizens of the United States, residing at Franklinville, in the county of Cattaraugus and State of New York, have invented certain new and useful Improvements in Milk-Pail Holders, of which the following is a specification, reference being had to the accompanying drawings.

This invention relates to improvements in devices for supporting a milk pail upon the knees of a person while milking a cow.

The object of the invention is to provide a simple and practical device of this character which may be produced at a small cost, which may be readily adjusted and applied to different sized milk pails and by means of which they may be effectively supported upon the knees during the milking operation.

With the above and other objects in view, the invention consists of the novel features of construction and the combination and arrangement of parts hereinafter fully described and claimed, and illustrated in the accompanying drawings, in which—

Figure 1 is a bottom perspective view of the invention; Fig. 2 is a side elevation or edge view of the same, a milk pail being indicated in dotted lines, and Fig. 3 is a detail sectional view.

The invention consists of a supporting bar or body having a deflected or offset portion to extend partially around a milk pail and provided at its ends with supporting arms to rest upon the knees, and also with means for detachably securing the pail in said body. To permit the body to be attached to milk pails of different sizes or different diameters, said body or bar is preferably made of two sections 1, 2, each of which has at its outer end one of the supporting arms 3. The inner ends of the sections 1, 2, are curved longitudinally into approximately a quarter of a circle and have straight extremities which are slidably engaged with each other to provide for the adjustment of the sections. This slidable engagement is preferably effected by enlarging the curved inner end 4 of the member 1 and recessing the same to provide grooved or undercut guide ribs 5 which receive the straight extremity of the curved inner ends 6 of the section 2. A set screw 7 is arranged in the threaded opening 8 in the enlarged inner end of the section 1 for the purpose of retaining the two sections in adjusted position, said set screw impinging against the straight extremity of the part 6, as will be readily understood on reference to Fig. 2. The supporting arms 3 may be of any shape and construction but they preferably have downwardly curved ends so that they will be less liable to slip off of the knees of the user.

The angular central portion of each of the sections 1, 2, is provided with a pair of spaced lugs, 9, 10, which receive the rim of the milk pail P between them, and one of which is provided with a clamping screw 11 for engagement with the pail to retain it between the lugs. These lugs depend from the bottom or under face of said sections, and the outer lugs 9 are undercut or hook-shaped as shown at 12 so as to take under the usual annular bead or rim R formed on the upper edge of the pail, as clearly shown in Fig. 2. The inner lugs 10 are formed with threaded openings for the reception of the set screws 11, as more clearly shown in Fig. 3. Owing to this construction it will be seen that the device may be quickly and easily adjusted upon and secured to milk pails of various sizes and shapes, and that when applied it will be rigidly attached and cannot slip off of the pail.

The use of the invention will be readily understood from the above description taken in connection with the drawings and it is therefore thought that further description is unnecessary. It will be noted, however, that the simple construction of the device permits it to be made at a very small cost and renders it strong and durable, and that the peculiar arrangement of its parts permits it to be quickly and easily applied to different sized milk pails.

Having thus described the invention what is claimed is:

1. A milk pail holder comprising a body having a substantially semi-circular central portion to extend partially around a milk pail, oppositely projecting supporting arms at its ends and clamping devices upon said body to engage the rim of a milk pail and attach the same thereto.

2. A milk pail holder comprising a body having a substantially semi-circular central portion to extend partially around a milk pail, oppositely projecting supporting arms at its ends, and clamping devices upon said body to engage the rim of a milk pail and attach the same thereto, each of said clamping devices consisting of spaced lugs and a set screw arranged in one of said lugs.

3. A milk pail holder comprising body members provided with curved inner ends slidably engaged with each other and oppositely projecting outer ends forming supporting arms and clamping devices on said members to engage the rim of a pail and attach the same thereto.

4. A milk pail holder comprising body members provided with curved inner ends slidably engaged with each other and oppositely projecting outer ends forming supporting arms, guides upon one of said members to slidably receive the other, a set screw in one of said members to impinge against the other and retain them in adjusted position, and clamping devices upon said members to engage the rim of a milk pail, each of said clamping devices consisting of spaced lugs and a set screw in one of said lugs.

5. A milk pail holder comprising a supporting bar adapted to rest at its opposite ends on the knees of the attendant and having its central part deflected to one side, and means for detachably securing a pail to the bar between its ends.

6. A milk pail holder comprising a supporting bar adapted to rest at its opposite ends on the knees of the attendant and composed of two sections which are adjustable relatively to each other, and means for detachably securing a pail to said bar.

In testimony whereof we hereunto affix our signatures in the presence of two witnesses.

EDWARD MOORE.
CHARLIE L. MOORE.

Witnesses:
W. L. McGeorge,
C. P. Adams.